United States Patent
Hamaker et al.

(10) Patent No.: US 8,775,183 B2
(45) Date of Patent: Jul. 8, 2014

(54) APPLICATION OF USER-SPECIFIED TRANSFORMATIONS TO AUTOMATIC SPEECH RECOGNITION RESULTS

(75) Inventors: Jonathan E. Hamaker, Issaquah, WA (US); Keith C. Herold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 12/483,919

(22) Filed: Jun. 12, 2009

(65) Prior Publication Data

US 2010/0318356 A1 Dec. 16, 2010

(51) Int. Cl.
*G10L 15/00* (2013.01)

(52) U.S. Cl.
USPC ........... 704/251; 715/210; 715/205; 709/227; 709/206; 707/741; 705/80; 705/20; 704/9; 704/8; 704/270.1; 704/270; 704/260; 704/235; 704/232; 341/51

(58) Field of Classification Search
CPC ..... G10L 13/02; G10L 13/027; G10L 13/033; G10L 13/08; G10L 15/00; G10L 15/02; G10L 15/08; G10L 15/22; G10L 15/26; G10L 19/00; G10L 19/19; G06F 3/00; G06F 3/167; G06Q 10/00; G06Q 40/00
USPC .............. 704/8, 9, 270.1, 270, 260, 251, 235, 704/232; 715/210, 205; 709/227, 206; 707/741; 705/80, 20; 341/51
See application file for complete search history.

(56) References Cited

U.S. PATENT DOCUMENTS

| | | | |
|---|---|---|---|
| 5,761,640 A * | 6/1998 | Kalyanswamy et al. | 704/260 |
| 5,867,816 A * | 2/1999 | Nussbaum | 704/232 |
| 6,523,172 B1 | 2/2003 | Martinez-Guerra et al. | |
| 7,225,130 B2 * | 5/2007 | Roth et al. | 704/270 |
| 7,461,151 B2 * | 12/2008 | Colson et al. | 709/227 |
| 7,496,511 B2 | 2/2009 | Vora | |
| 7,509,258 B1 | 3/2009 | Roy | |
| 7,570,180 B2 * | 8/2009 | Osorio | 341/51 |
| 7,743,061 B2 * | 6/2010 | Jones et al. | 707/741 |
| 7,873,541 B1 * | 1/2011 | Klar et al. | 705/20 |
| 8,001,195 B1 * | 8/2011 | Kalinin | 709/206 |
| 8,340,966 B2 * | 12/2012 | Kerimovska et al. | 704/260 |
| 2004/0034532 A1 * | 2/2004 | Mukhopadhyay et al. | 704/270.1 |

(Continued)

OTHER PUBLICATIONS

Laubsch, et al. , "Software for Applied Semantics", Retrieved at <<http://citeseerx.ist.psu.edu/viewdoc/download?doi=10.1.1.105.2075&rep=rep1&type=pdf>>, pp. 15-30.

(Continued)

*Primary Examiner* — Michael Colucci
(74) *Attorney, Agent, or Firm* — Steven Spellman; Peter Taylor; Micky Minhas (57) ABSTRACT

Textual transcription of speech is generated and formatted according to user-specified transformation and behavior requirements for a speech recognition system having input grammars and transformations. An apparatus may include a speech recognition platform configured to receive a user-specified transformation requirement, recognize speech in speech data into recognized speech according to a set of recognition grammars; and apply transformations to the recognized speech according to the user-specified transformation requirement. The apparatus may further be configured to receive a user-specified behavior requirement and transform the recognized speech according to the behavior requirement. Other embodiments are described and claimed.

16 Claims, 5 Drawing Sheets

(56) References Cited

U.S. PATENT DOCUMENTS

| | | | |
|---|---|---|---|
| 2004/0267731 A1* | 12/2004 | Gino Monier et al. | 707/3 |
| 2005/0114131 A1* | 5/2005 | Stoimenov et al. | 704/251 |
| 2006/0069545 A1* | 3/2006 | Wu et al. | 704/8 |
| 2007/0016401 A1* | 1/2007 | Ehsani et al. | 704/9 |
| 2007/0106515 A1 | 5/2007 | Wong | |
| 2007/0157083 A1* | 7/2007 | Roy et al. | 715/522 |
| 2007/0283244 A1* | 12/2007 | Hays | 715/513 |
| 2007/0299664 A1* | 12/2007 | Peters et al. | 704/235 |
| 2008/0162140 A1 | 7/2008 | Silva et al. | |
| 2008/0235022 A1 | 9/2008 | Bergl et al. | |
| 2009/0157385 A1* | 6/2009 | Tian | 704/9 |
| 2009/0216683 A1* | 8/2009 | Gutierrez | 705/80 |

OTHER PUBLICATIONS

Shenoy, et al., "Compositional Specification and Realization of Mixed-Initiative Web Dialogs", Retrieved at <<http://people.cs.vt.edu/ramakris/papers/dialogxml-uidl.pdf>>, pp. 1-26.

Brown Robert, "Exploring New Speech Recognition and Synthesis APIs in Windows Vista", Retrieved at <<http://msdn.microsoft.com/en-us/magazine/cc163663.aspx>>, Apr. 8, 2009, pp. 1-8.

Zeni, et al., "Semi-Automatic Semantic Annotations for Web Documents", Retrieved at <<http://research.cs.gueensu.ca/~cordy/Papers/KZCMM_SWAP05.pdf>>, pp. 15.

"ISpCFGInterpreter", Retrieved at <<http://msdn.microsoft.com/en-us/library/aa911617.aspx>>, Aug. 28, 2008, pp. 1.

\* cited by examiner

```
1   <rule id="datetime">
2       <item>
3           <ruleref uri="Time"/>
4           <tag> Out.MicrosoftSREngineITNCategory="Time_cat"</tag>
5       </item>
6       <item>
7           <ruleref uri="Date"/>
8           <tag> Out.MicrosoftSREngineITNCategory="Date_cat"</tag>
9       </item>
10  </rule>
```

APPLICATION OF USER-SPECIFIED TRANSFORMATIONS TO AUTOMATIC SPEECH RECOGNITION RESULTS

BACKGROUND

Speech recognition systems convert spoken audio data into human-readable text. Speech recognition may be used in many applications, such as, but not limited to, close-captioning of multimedia, transcription of dictation, and conversion of voicemail messages to text for e-mail or instant messaging. In addition to merely recognizing raw words from speech, speech recognition systems may apply transformational techniques to convert the raw spoken word stream to a form more appropriate for display. For example, some words are capitalized, punctuation is added, or spacing and abbreviation rules are applied, etc. Different applications using speech recognition may require different formatting conventions.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling techniques for applying user-specified transformations to automatic speech recognition results. In one embodiment, for example, a user may create a user-specified behavior requirement and/or a user-specified transformation requirement to provide to a speech recognition component. The user-specified behavior requirement may change the behavior of the speech recognition component's input grammars regarding which built-in transformations to apply, if any. The user-specified transformation requirement may provide information to the speech recognition component for how to transform specific types of recognized speech.

These and other features will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a textual transcription of speech in audio data may be generated and provided to users of the speech recognition system. Embodiments may allow users of the speech recognition system to control the transformations, e.g. formatting. Embodiments may allow the users to customize the transformations, for example, by specifying text normalization requirements directly in recognition grammars. In the following discussion, a "user" may refer to a person, such as an application developer, or an application that requests speech results from a speech recognition system.

According to some embodiments, a transcription of speech may be generated by means of automatic speech recognition and delivered or displayed to the recipient. A speech recognizer may be integrated directly with other applications, such as but not limited to, voicemail and messaging systems.

Figure 1:
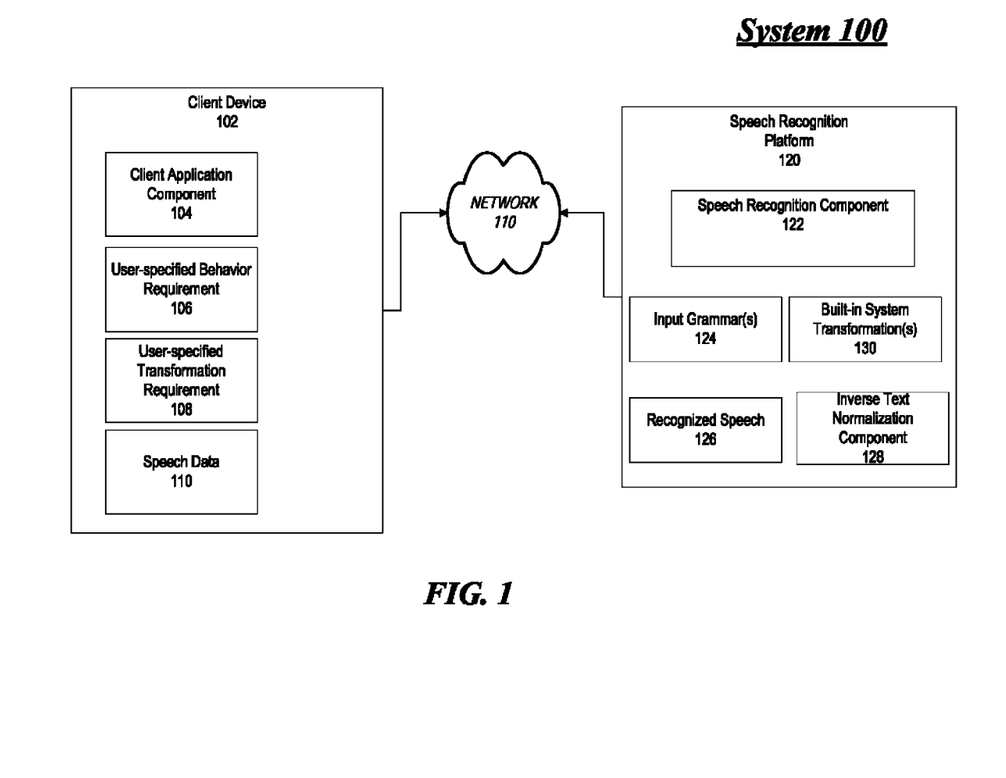
FIG. 1 illustrates an embodiment of a system.

FIG. 1 illustrates a block diagram for a system 100 to apply user-specified transformations to speech recognition results. In one embodiment, for example, the system 100 may comprise a computer-implemented system 100 having multiple components, such as client device 102, speech recognition platform 120, and a network 110. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components may be communicatively coupled via various types of communications media. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may include a client device component 102. Client device 102 may be a device, such as, but not limited to, a mobile device, a personal desktop or laptop computer. Client device 102 may include a client application component 104, a user-specified behavior requirement 106, a user-specified transformation requirement 108, and/or speech data 110.

Client application component 104 may be any application operating on client device 102 that may make use of speech recognition technology. In one example, client application 104 may be an application that recognizes speech from voice mail messages and sends the recognized speech in the form of text-based email messages or text messages. In another example, client application 104 may be an application that transcribes physicians' treatment notes for entry into an electronic health record. Client application component 104 may have some of its own recognition grammars (not shown).

User-specified behavior requirement 106 may specify one or more user requirements for how an input grammar of a speech recognition system should apply built-in transformations. User-specified behavior requirement 106 may, for example, select a transformation (i.e. turn on a transformation) to apply, or de-select a transformation (i.e. turn off a transformation). User-specified behavior requirement 106 may specify whether the built-in transformation or an alternate user-specified transformation, should be applied.

User-specified behavior requirement 106 may specify a behavior for one portion of the input grammar, and a second behavior for a second portion of the input grammar. For example, in a recognized phrase that includes different types of contact information, user-specified behavior requirement 106 may specify different transformations to apply to each of a phone number, an email address, a proper name, etc. in the recognized phrase.

In an embodiment, user-specified behavior requirement 106 may be a grammar that includes rules, tags or categories in the semantics of the grammar. User-specified behavior requirement 106 may also be in the form of, for example but not limited to, an application program interface (API) call, an extensible markup language (XML) element or XML schema, speech recognition application parameters, etc.

User-specified transformation requirement 108 may specify one or more transformations that may be applied to recognized speech. User-specified transformation requirement 108 may, for example, specify how to format a number that is recognized as a phone number. User-specified transformation requirement 108 may substitute for a built-in transformation.

In an embodiment, the user may encode requirements into a speech recognition grammar specification (SRGS) grammar (in W3C standard format). In an embodiment, this may be done by specifying semantic interpretation for speech recognition (SISR) semantic tags (in W3C standard format) in the grammar that may be understood by a speech recognition (SR) engine. In the semantic tag, the user may provide different requirements at different levels of granularity in the grammar so that fine control is permitted. For example, a semantic tag may specify categories for a proper name, a phone number, an address, a date, a time, an email address, an internet protocol address, a web address, etc. In an embodiment, the requirements may be encoded by adding an XML element, extending the SRGS specification.

Speech data 110 may be live or recorded and stored speech data that a speech recognition system may perform speech recognition on. Speech data 110 may be received via an input, e.g. a microphone (not shown), or via communication with another device. Speech data 110 may be transmitted to speech recognition platform 120, for example, via network 110.

System 100 may further include a speech recognition platform 120. Speech recognition platform 120 may include a speech recognition component 122. Speech recognition component 122 may perform speech recognition functions on input speech data, such as speech data 110. Speech recognition component 122 may use one or more input grammar(s) 124 to produce recognized speech 126. In the context of this description, input grammars 124 may include both grammars that were present when speech recognition platform 120 was initially deployed, and grammars added to speech recognition platform 120 after deployment. Speech recognition component 122 may use one or more built-in transformations 130 to format recognized speech 126. The user may be able to specify which of the built-in transformations 130 should be enacted. The user may optionally disable all built-in transformations 130.

Recognized speech 126 may be in the form of a text transcript of the input speech data. In an embodiment, recognized speech 126 may also include actionable items, such as a hyperlink, a macro, a link to an audio file that plays when selected, or other computer-implemented tasks based on the recognized speech. Recognized speech 126 may also include graphics, such as emoticons, check marks, check boxes, etc.

Speech recognition platform 120 may include an inverse text normalization (ITN) component 128. ITN component 128 may assist with formatting and other transformations of recognized speech by converting a spoken numeric or symbolic value to appear as a number or symbol when translated by speech recognition component 122. In an embodiment, the ITN component 128 may use different categories. In order to tell the speech recognition component 122 to use the correct ITN category, a user may insert the appropriate category in the semantics for a given grammar rule. The category may be implemented in the semantics as a string-value that may be matched by speech recognition component 122 to available categories.

Conventionally, speech recognition grammars, such as a SRGS grammar, and ITN systems may be unaware of each other. Although an SR system using an SRGS grammar may mark an entity for example, as a phone number or name, the ITN system may not know or understand the recognized tags. The ITN system may ignore or misinterpret the recognized tags. This may result in odd display formats for known entities.

For example, in a voice-mail SR system, the caller leaving the voice mail may speak an office phone number where the caller can be reached: "office 4 2 5 5 5 5 4 1 0 0". The SR system may recognize this as "office dot <PHONE>4 2 5 5 5 5 4 1 0 0</PHONE>". The ITN system may not be aware of the <PHONE> tag, and may use more context to arrive at the incorrect decimal display form, e.g. office 0.4255554100. Meanwhile, the user might expect to see: office dot (425) 555-4100.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 2:
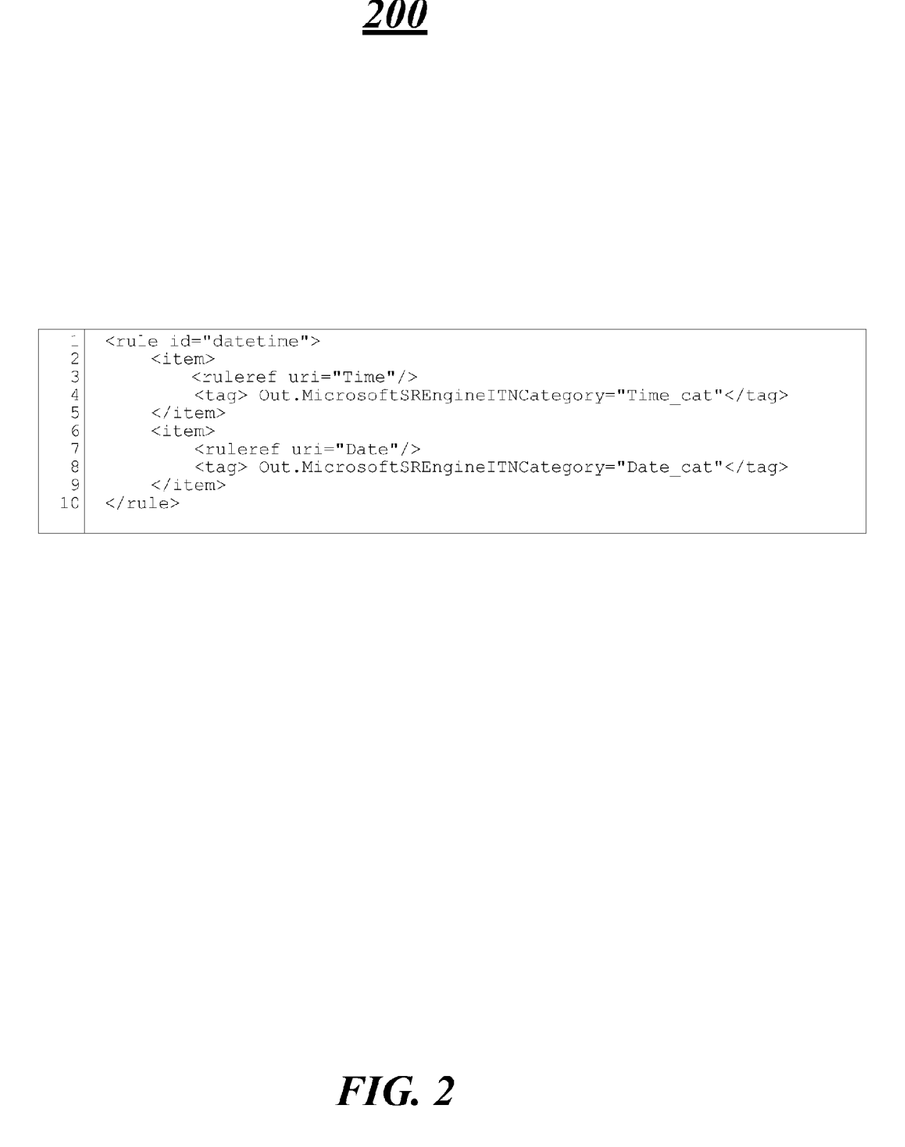
FIG. 2 illustrates an embodiment of a portion of a grammar.

FIG. 2 illustrates an embodiment of a portion 200 of a grammar. Portion 200 may be a portion of a user-specified transformation requirement 108. Line 1 identifies the name of the grammar rule as "datetime". The rule illustrated in portion 300 contains two sub-rules. A Time sub-rule is shown on lines 2-5. A Date sub-rule is shown on lines 6-9. Line 4 specifies an ITN category of "Time_cat". Line 8 specifies an ITN category of "Date_cat". The illustrated rule may be enable speech recognition component 122 to transform recognized speech of "one thirty december tenth" into "1:30 December 10$^{th}$".

Figure 3:
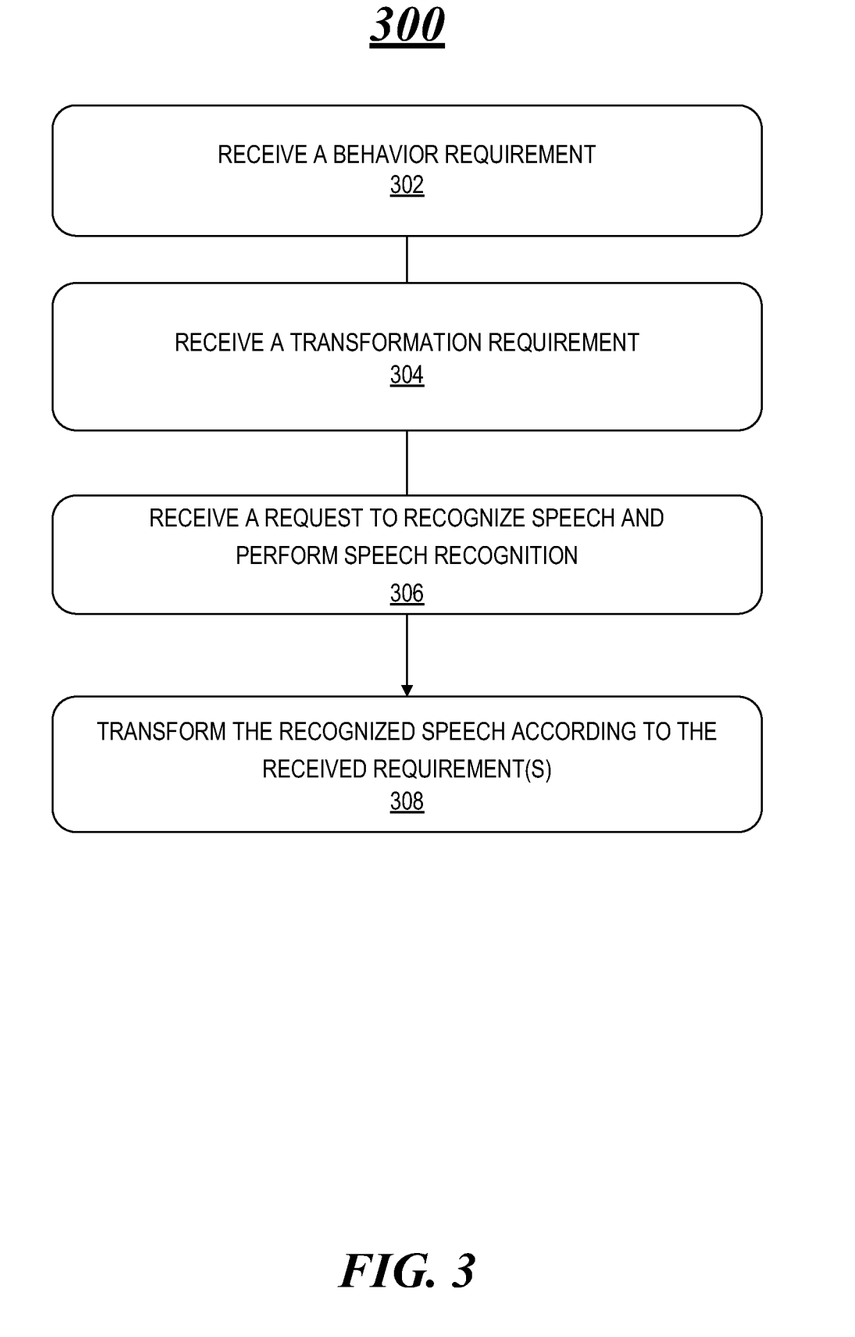
FIG. 3 illustrates an embodiment of a logic flow.

FIG. 3 illustrates one embodiment of a logic flow 300. The logic flow 300 may be representative of some or all of the operations executed by one or more embodiments described herein.

In the illustrated embodiment shown in FIG. 3, the logic flow 300 may receive a behavior requirement at block 502. The behavior requirement may be user-specified behavior requirement 106. The behavior requirement may include rules, settings, tags or other factors that affect how built-in transformations are applied by the receiving speech recognition component. For example, the behavior requirement may change a setting of an input grammar, such as selecting or de-selecting a transformation from a set of built-in transformations.

The logic flow 300 may receive a transformation requirement at block 304. The transformation requirement may be user-specified transformation requirement 108. The transformation requirement may include rules, settings, tags or other factors that may instruct the receiving speech recognition component how to transform or format recognized speech.

The logic flow 300 may receive a request to recognize speech from an application, and perform speech recognition on speech data at block 306. The result of the speech recognition may be a recognized word sequence. Speech recognition component 122 may use input grammars 124 during the speech recognition process. At recognition time, speech recognition component 122 may determine which transformations from the user and/or from the system should be applied to each sub-segment of the recognized word sequence. This may be done, for example, by examining the semantic tags associated with each sub-segment as specified in the grammar. The specified transformations are applied to the sub-segments and the overall result is returned to the calling application.

The logic flow 300 may transform the recognized word sequence according to a behavior requirement in the user-specified behavior requirement 106, a transformation requirement in the user-specified transformation requirement 108, or both. Transforming the word sequence may include determining which transformations to apply to a sub-segment of the recognized word sequence according to a semantic tag associated with the sub-segment.

Embodiments of the invention may be illustrated in view of the following, non-limiting example. Suppose speech data 110 contains the following recognized spoken words:

Hi Bob this is Sally I'm just calling to congratulate you on the reintegration of the enhanced tagging feature into your product I'm happy that it's back on hey our new IP address is two five three zero three three zero five three give me a call at extension six one oh monday if you have more information.

The desired output may be:

Hi Bob this is Sally I'm just calling to congratulate you on the reintegration of the enhanced tagging feature into your product I'm happy that it's back on hey our new IP address is 253.3.30.53 give me a call at x610 Monday if you have more information.

The input grammar may have default tags. In addition, a user may have added a user-specified transformation that recognizes IP addresses. The user may disable any built-in transformations of IP addresses, for example, by setting an ITN category to "NONE", or de-selecting a related transformation. The disabling may be done by creating a user-specified behavior requirement 106 to provide to speech recognition component 122.

Speech recognition component 122 may group the text into word spans. Different rules and ITN categories may be called on each span. Each ITN word span is defined by the ITN system line. For example, the text that contains "normal" speech, such as the span "Hi Bob this is Sally I'm just calling to congratulate you on the reintegration of the enhanced tagging feature into your product I'm happy that it's back on hey our new" may not require any special processing. The span that contains "IP address is two five three zero three three zero five three," however, will require the application of the user-specified transformation grammar as well as the non-use of any IP address related input grammar transformations to produce the correct output of "IP address is 253.3.30.53".

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing applications that make use of speech technology. Examples of platforms include, but are not limited to, a hosted service executed over a plurality of servers, an application executed on a single server, and comparable systems. Other examples include, but are not limited to, mobile device search, home media electronics and desktop computers. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 4:
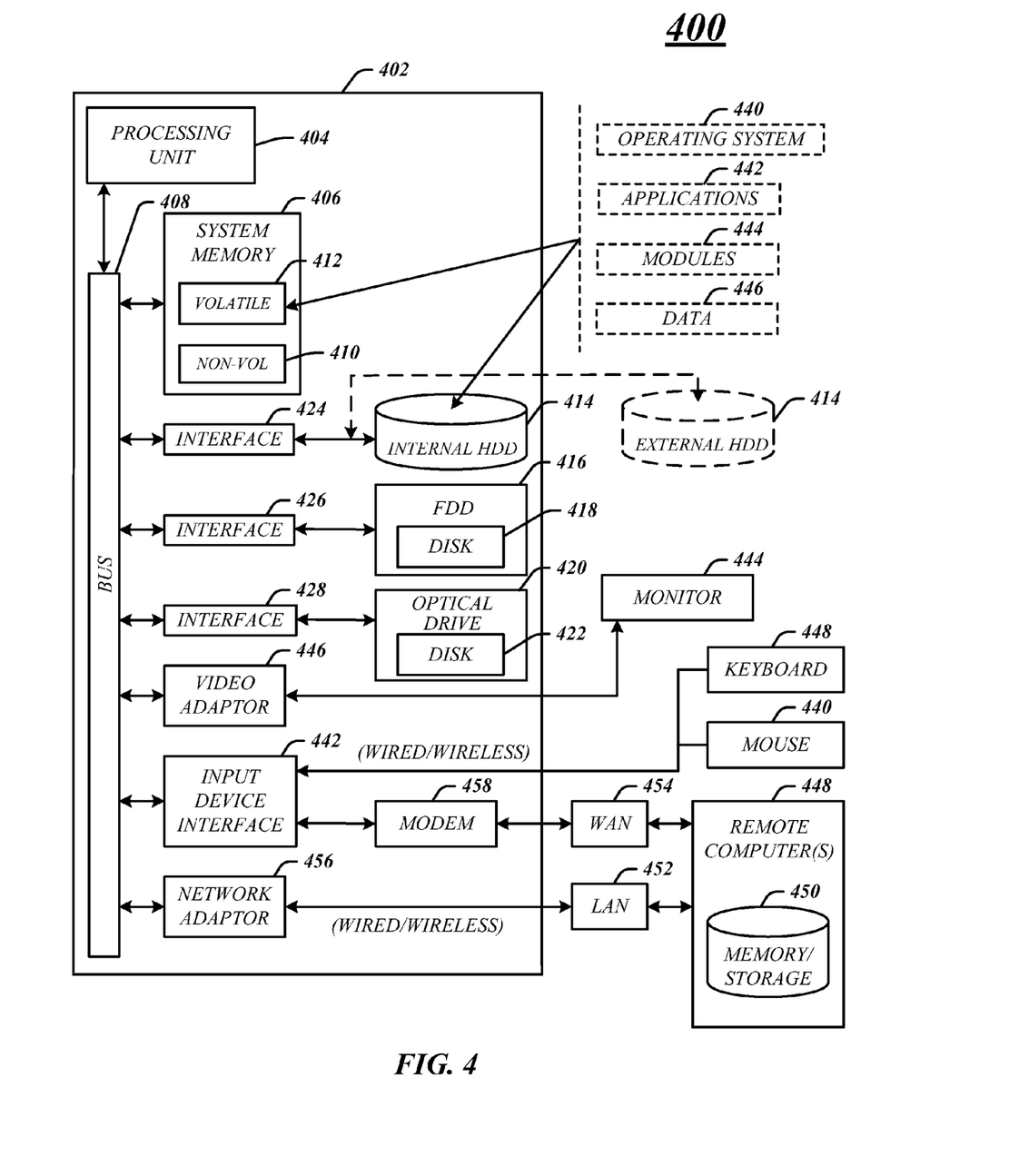
FIG. 4 illustrates an embodiment of a computing architecture.

FIG. 4 illustrates an embodiment of an exemplary computing architecture 400 suitable for implementing various embodiments as previously described. The computing architecture 400 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 400.

As shown in FIG. 4, the computing architecture 400 comprises a processing unit 404, a system memory 406 and a system bus 408. The processing unit 404 can be any of various commercially available processors. Dual microprocessors and other multi-processor architectures may also be employed as the processing unit 404. The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures.

The system memory 406 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 4, the system memory 406 can include non-volatile memory 410 and/or volatile memory 412. A basic input/output system (BIOS) can be stored in the non-volatile memory 410.

The computer 402 may include various types of computer-readable storage media, including an internal hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by a HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. The one or more application programs 432, other program modules 434, and program data 436 can include, for example, client application component 104, or speech recognition component 122.

A user can enter commands and information into the computer 402 through one or more wire/wireless input devices, for example, a keyboard 438 and a pointing device, such as a mouse 440. Other input devices may include a microphone, an infra-red (IR) remote control, a joystick, a game pad, a stylus pen, touch screen, or the like. These and other input devices are often connected to the processing unit 404 through an input device interface 442 that is coupled to the system bus 408, but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all of the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454, or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 5:
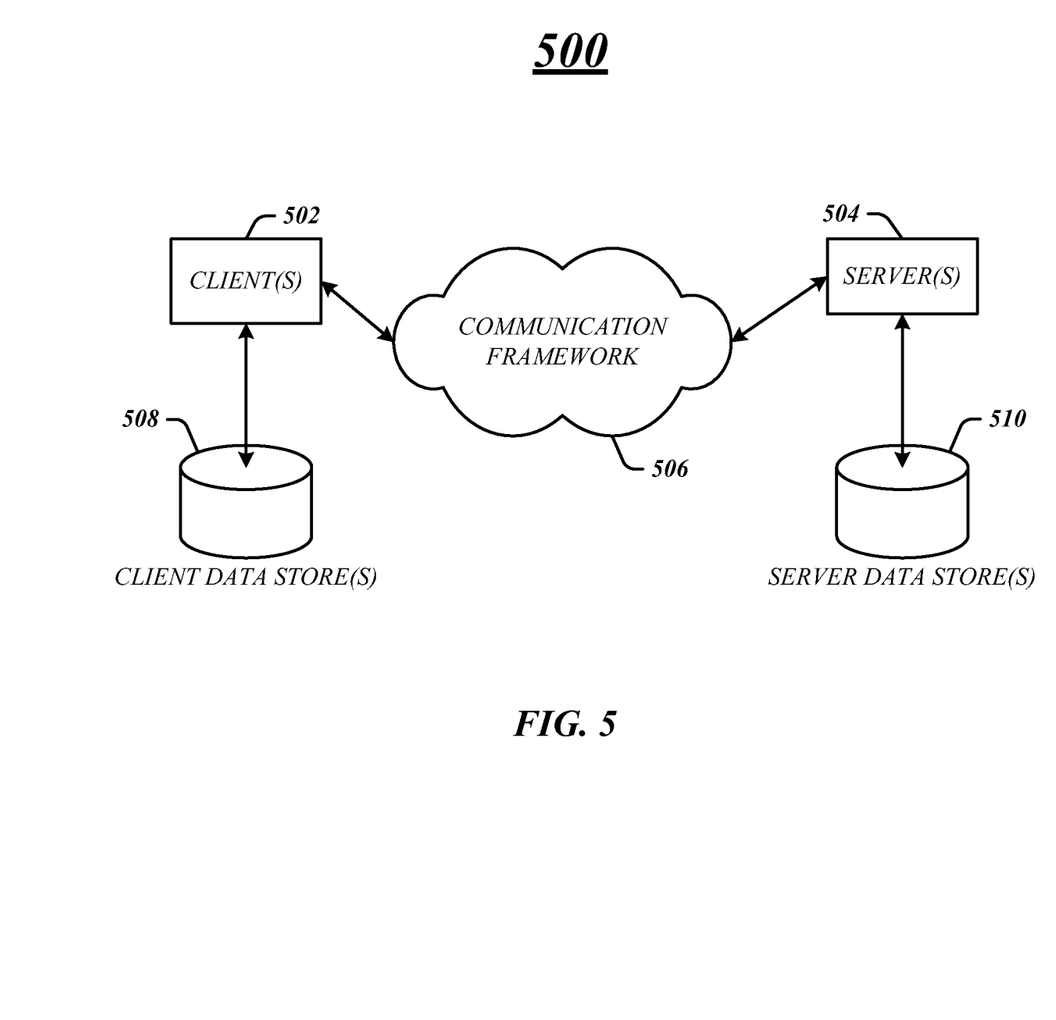
FIG. 5 illustrates an embodiment of a communications architecture.

FIG. 5 illustrates a block diagram of an exemplary communications architecture 500 suitable for implementing various embodiments as previously described. The communications architecture 500 includes various common communications elements, such as a transmitter, receiver, transceiver, radio, network interface, baseband processor, antenna, amplifiers, filters, and so forth. The embodiments, however, are not limited to implementation by the communications architecture 500.

As shown in FIG. 5, the communications architecture 500 comprises includes one or more clients 502 and servers 504. The clients 502 may implement the client device 102. The servers 504 may implement the speech recognition platform 120. The clients 502 and the servers 504 are operatively connected to one or more respective client data stores 508 and server data stores 510 that can be employed to store information local to the respective clients 502 and servers 504, such as cookies and/or associated contextual information.

The clients 502 and the servers 504 may communicate information between each other using a communication framework 506. The communications framework 506 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 502 and the servers 504 may include various types of standard communication elements designed to be interoperable with the communications framework 506, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 502 and a server 504 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
   receiving, from a client device, a user-specified behavior requirement in a speech recognition system wherein the user-specified behavior requirement changes a setting to an input speech recognition grammar specification prior to recognizing speech to select or de-select a built-in transformation from a set of built-in transformations of the speech recognition system to apply to recognized speech, and wherein the user-specified behavior requirement includes a semantic tag that specifies at least one of: a proper name, a phone number, an address, an email address, an internet protocol address, and a web address;
   encoding the received user-specified behavior requirement into an input speech recognition grammar specification for the speech recognition system;
   receiving a request to recognize speech from an application;
   recognizing the speech to form a recognized word sequence;
   transforming the recognized word sequence according to the user-specified behavior requirement according to a semantic tag associated with the word sequence; and
   providing the transformed sequence to the application.

2. The method of claim 1, comprising:
   receiving a user-specified transformation requirement in the speech recognition system wherein the user-specified transformation requirement includes a semantic tag; and
   transforming the recognized word sequence according to at least one of the user-specified behavior requirement or the user-specified transformation requirement according to a semantic tag associated with the word sequence.

3. The method of claim 2, wherein transforming the recognized word sequence comprises:
   determining which transformations to apply to a sub-segment of the recognized word sequence according to a semantic tag associated with the sub-segment.

4. The method of claim 3, wherein the semantic tag further specifies at least one of: a date, and a time.

5. The method of claim 1 wherein the user-specified behavior requirement comprises at least one of: a grammar, an application program interface (API) call, an extensible markup language (XML) element, an XML schema, or speech recognition application parameters.

6. The method of claim 1, wherein the user-specified behavior requirement specifies a first transformation for a first portion of the input speech recognition grammar specification, and a second transformation for a second portion of the input speech recognition grammar specification.

7. A system for implementing formatted recognized speech, the system comprising:
   a speech recognition platform configured to:
      receive a user-specified behavior requirement, wherein the user-specified behavior requirement changes a setting to an input speech recognition grammar specification to select or de-select a built-in transformation from a set of built-in transformations of the speech recognition system;
      receive a user-specified transformation requirement, wherein the user-specified transformation requirement specifies prior to recognizing speech to the speech recognition platform transformations to apply to recognized speech and wherein the user-specified transformation requirement includes a semantic tag that specifies at least one of: a proper name, a phone number, an address, an email address, an internet protocol address, and a web address;
      encode the user-specified transformation requirement into the input speech recognition grammar specification for the speech recognition platform;
      recognize speech in speech data into recognized speech according to a set of recognition grammars including the input speech recognition grammar specification; and
      apply transformations to the recognized speech according to the user-specified transformation requirement.

8. The system of claim 7, further comprising:
   a client application configured to:
      create a user-specified transformation requirement;
      encode the created user-specified transformation requirement into the speech recognition grammar specification for the speech recognition platform; and
      request speech recognition using the user-specified transformation requirement from the speech recognition platform.

9. The system of claim 7, wherein the user-specified behavior requirement includes a semantic tag that specifies at least one of: a proper name, a phone number, an address, an email address, an internet protocol address, and a web address; and
   the speech recognition platform further configured to:
      encode the user-specified behavior requirement into the speech recognition grammar specification for the speech recognition platform; and
      transform the recognized word sequence according to the user-specified behavior requirement.

10. The system of claim 7, wherein at least one of the user-specified transformation requirement or the user-specified behavior requirement comprises at least one of: a grammar, an application program interface (API) call, an extensible markup language (XML) element, an XML schema, or speech recognition application parameters.

11. The system of claim 9, the speech recognition platform further configured to: determine which transformations to apply to a sub-segment of the recognized speech according to a semantic tag associated with the sub-segment.

12. The system of claim 7, wherein the user-specified behavior requirement specifies a first transformation for a first portion of the input speech recognition grammar specification, and a second transformation for a second portion of the input speech recognition grammar specification.

13. An article comprising a storage medium containing instructions that if executed enable a system to:
   receive a request to recognize speech from an application;

recognize the speech to form a recognized word sequence;
transform the recognized word sequence according to a user-specified behavior requirement encoded into an input speech recognition grammar specification, wherein the user-specified behavior requirement changes a setting prior to recognizing speech to the input speech recognition grammar to select or de-select a built-in transformation from a set of built-in transformations of a speech recognition system to apply to recognized speech, and wherein the user-specified behavior requirement includes a semantic tag that specifies at least one of: a proper name, a phone number, an address, an email address, an internet protocol address, and a web address; and
provide the transformed sequence to the application.

14. The article of claim 13, further comprising instructions that if executed enable the system to transform the recognized word sequence according to at least one of the user-specified behavior requirement or a user-specified transformation requirement, wherein the user-specified transformation requirement includes a semantic tag that specifies at least one of: a proper name, a phone number, an address, an email address, an internet protocol address, and a web address.

15. The article of claim 13, wherein at least one of the user-specified behavior requirement or a user-specified transformation requirement includes a semantic tag, and further comprising instructions that if executed enable the system to: determine which transformations to apply to a sub-segment of the recognized word sequence according to a semantic tag associated with the sub-segment.

16. The article of claim 13, wherein the user-specified behavior requirement specifies a first transformation for a first portion of the input speech recognition grammar specification, and a second transformation for a second portion of the input speech recognition grammar specification.

* * * * *